(12) United States Patent
Hansen, III et al.

(10) Patent No.: US 8,191,857 B2
(45) Date of Patent: Jun. 5, 2012

(54) LINEAR MOTOR VALVE

(75) Inventors: Charles C. Hansen, III, Hinsdale, IL (US); Erik J. Guldberg, Darien, IL (US); William H. Yeadon, Iron River, MI (US); Bradley M. Frustaglio, Germantown, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 52 days.

(21) Appl. No.: 12/755,508

(22) Filed: Apr. 7, 2010

(65) Prior Publication Data
US 2010/0243931 A1 Sep. 30, 2010

Related U.S. Application Data

(63) Continuation of application No. PCT/US2008/079266, filed on Oct. 9, 2008.

(51) Int. Cl.
*F16K 31/04* (2006.01)
(52) U.S. Cl. ............... 251/129.1; 251/325; 335/256
(58) Field of Classification Search .. 251/129.09–129.1, 251/129.21, 325; 335/256; 137/553
See application file for complete search history.

(56) References Cited

U.S. PATENT DOCUMENTS

| | | | |
|---|---|---|---|
| 2,003,647 A | 6/1935 | Dillstrom | |
| 2,629,401 A | 2/1953 | Miller | |
| 3,070,715 A | 12/1962 | Widmer | |
| 3,625,477 A * | 12/1971 | Vogel | 251/129.1 |
| 4,254,935 A | 3/1981 | Jarrett | |
| 4,501,981 A | 2/1985 | Hansen | |
| 4,550,693 A | 11/1985 | Saur | |
| 4,726,453 A | 2/1988 | Obstfelder et al. | |
| 4,879,482 A | 11/1989 | Murofushi | |
| 4,926,629 A | 5/1990 | Eick et al. | |
| 4,984,541 A | 1/1991 | Kawamura | |
| 5,069,422 A | 12/1991 | Kawamura | |
| 5,115,772 A | 5/1992 | Kawamura | |
| 5,131,441 A | 7/1992 | Simpson et al. | |
| 5,184,309 A | 2/1993 | Simpson et al. | |
| 5,533,707 A | 7/1996 | Beesley | |
| 5,544,815 A | 8/1996 | Cooke et al. | |
| 5,693,989 A | 12/1997 | Satomi et al. | |
| 5,734,209 A | 3/1998 | Hallidy | |
| 5,794,860 A | 8/1998 | Neumann | |
| 5,831,353 A | 11/1998 | Bolding et al. | |
| 5,906,351 A | 5/1999 | Aardema et al. | |
| 5,947,155 A * | 9/1999 | Miki et al. | 251/129.1 |
| 6,192,923 B1 * | 2/2001 | Schexnayder et al. | 251/129.1 |
| 6,329,728 B1 | 12/2001 | Kitazawa et al. | |
| 6,755,161 B2 * | 6/2004 | Grundl et al. | 251/129.09 |
| 6,853,099 B2 | 2/2005 | Uchida | |
| 6,917,136 B2 | 7/2005 | Thornton et al. | |

(Continued)

*Primary Examiner* — John Bastianelli
(74) *Attorney, Agent, or Firm* — Thomas Fistek

(57) ABSTRACT

A valve having a valve body having spaced inlet and outlet ports separated by an intermediate valve seat in open communication with the inlet and outlet ports includes a piston and a valve member being adapted to sealingly mate with the valve seat. A biasing member is positioned to bias the valve member toward the valve seat. A linear motor assembly attached to the valve body, the linear motor having a plurality of stator discs, a plurality of stator coils, a plurality of teeth defining a cylindrical opening, and a slider positioned within the cylindrical opening. The slider has a plurality of teeth defining a generally cylindrical outer periphery of the slider and is movable in response to magnetic flux generated by electrical current passing through one or more of the stator coils.

13 Claims, 16 Drawing Sheets

U.S. PATENT DOCUMENTS

| | | |
|---|---|---|
| 6,918,571 B1 | 7/2005 | Rose |
| 6,919,653 B2 | 7/2005 | Thirunarayan et al. |
| 7,021,603 B2 | 4/2006 | Wygnaski |
| 7,087,036 B2 | 8/2006 | Busby et al. |
| 7,137,614 B2 | 11/2006 | Masui et al. |
| 7,199,492 B2 | 4/2007 | Hashimoto et al. |
| 7,242,117 B2 | 7/2007 | Sugita et al. |
| 7,261,186 B2 | 8/2007 | Deplazes et al. |
| 2006/0028072 A1 | 2/2006 | Iwasa et al. |
| 2006/0238039 A1 | 10/2006 | Niedmeyer et al. |

* cited by examiner

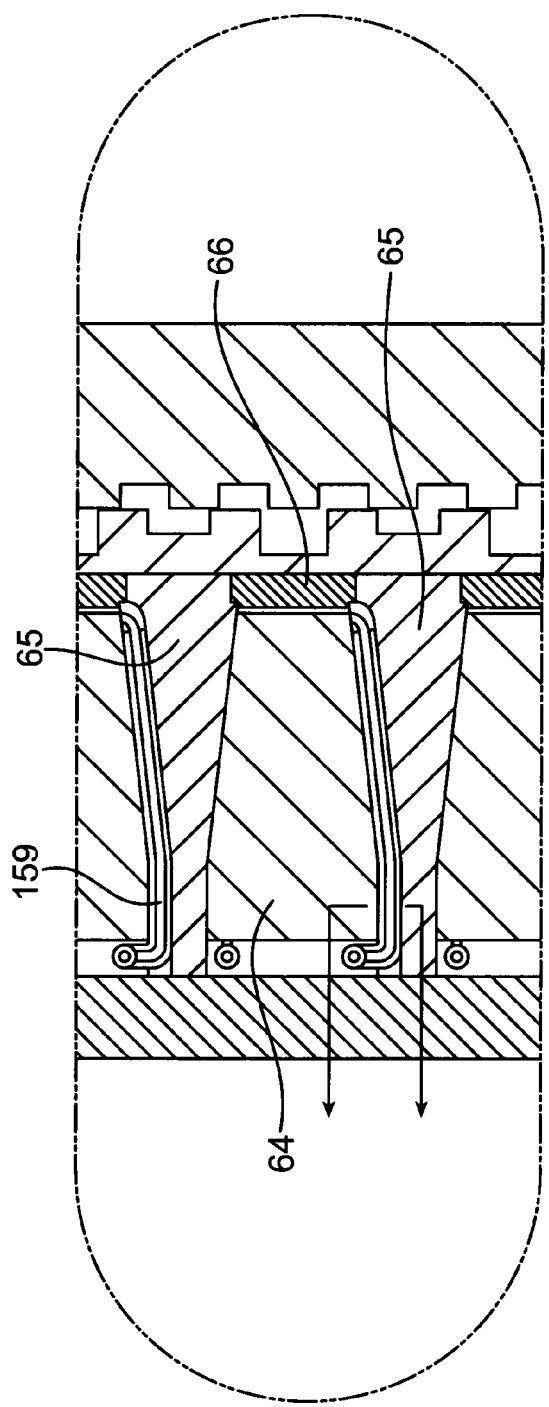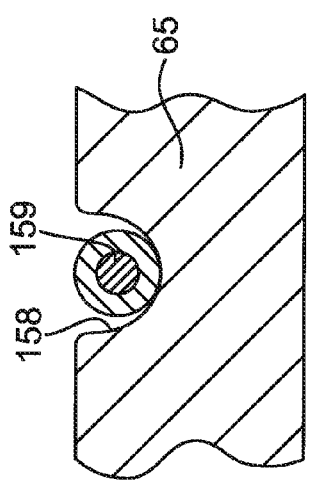

LINEAR MOTOR VALVE

CROSS-REFERENCE TO RELATED CASES

This application is a continuation of International Application PCT/US2008/079266, with an international filing date of Oct. 9, 2008 published in English under PCT Article 21(2).

TECHNICAL FIELD

The present invention relates to electrically driven motorized valves whereby the valve port is opened by the electrical lifting of a valve seat.

BACKGROUND

Fluids are conveyed through pipes and conduits for all sorts of purposes: heating systems, hydraulic systems, fluid transport, water supply systems, refrigeration systems, and similar purposes. In such systems many types of valves are used for servicing or control. Valve types include shut-off valves, check valves, throttling valves, relief valves, pressure regulating valves, solenoid valves, and, among others, motorized valves powered by air, hydraulics, or electricity.

Motorized valves are useable for most types of fluids including refrigerants, brines, water, oils hydraulic liquids, and similar fluids. As systems have become more complicated and requirements more precision, there has been an increasing need for a broader range of motorized valves along with the other related more simple valves mentioned above. However, as environmental atmospheric pollution requirements become increasingly stringent, there is an increasing need to eliminate valve designs with external motors having valve stems and accompanying stem packings. This has caused a trend toward valve concepts having internal motors or motors whose forces are transmitted to the valve seat via magnetic rotary couplings or other leak proof stationary barrier designs instead of stems and packings. Internal motors having electrical parts in the controlled fluid suffer from corrosion or high friction problems while magnetic couplings have high friction and reliability concerns.

SUMMARY

At least one embodiment of the invention provides a valve comprising: a valve body having spaced inlet and outlet ports separated by an intermediate valve seat in open communication with the inlet and outlet ports; a piston reciprocable within a bore in the valve body; a valve member being adapted to sealingly mate with the valve seat; a biasing member for normally biasing the valve member toward the valve seat; a linear motor assembly attached to the valve body, the linear motor comprising a plurality of stator discs, a plurality of stator coils, and a plurality of teeth defining a cylindrical opening, a slider positioned within the cylindrical opening, the slider having a plurality of teeth defining a generally cylindrical outer periphery of the slider, the slider being movable in response to magnetic flux generated by electrical current passing through one or more of the stator coils.

At least one embodiment of the invention provides a valve comprising: a valve body having spaced inlet and outlet ports separated by an intermediate valve seat in open communication with the inlet and outlet ports; a piston reciprocable within a bore in the valve body; a valve member being adapted to sealingly mate with the valve seat; a biasing member for normally biasing the valve member toward the valve seat; a linear motor assembly attached to the valve body, the linear motor comprising a plurality of stator discs, a plurality of copper wire wound stator coils, and a cylindrical tube having a plurality of teeth forming defining a cylindrical opening, a slider positioned within the cylindrical opening, the slider having a plurality of teeth defining a generally cylindrical periphery of the slider assembly, the slider being movable in response to magnetic flux generated by electrical current passing through one or more of the stator coils, and a linear position sensor coupled to the slider.

At least one embodiment of the invention provides a valve comprising: a valve body having spaced inlet and outlet ports separated by an intermediate valve seat in open communication with the inlet and outlet ports; a piston reciprocable within a bore in the valve body; a valve member being adapted to sealingly mate with the valve seat; a biasing member for normally biasing the valve member toward the valve seat; a linear motor assembly attached to the valve body, the linear motor comprising a plurality of steel stator discs, a plurality of copper wire wound stator coils, and a steel cylindrical tube having a plurality of teeth forming defining a cylindrical opening, a steel slider positioned within the cylindrical opening, the slider having a plurality of teeth defining a generally cylindrical periphery of the slider assembly, the slider being movable in response to magnetic flux generated by electrical current passing through one or more of the stator coils.

BRIEF DESCRIPTION OF THE DRAWINGS

FIG. 13A is a detail view of an alternate embodiment of the stator core assembly of FIG. 2 wherein a wiring groove is machined into the face of the stator disc.

FIG. 13B is a cross-sectional view of the wire of FIG. 13A in the wiring groove.

DETAILED DESCRIPTION OF THE DRAWINGS

Figure 1:
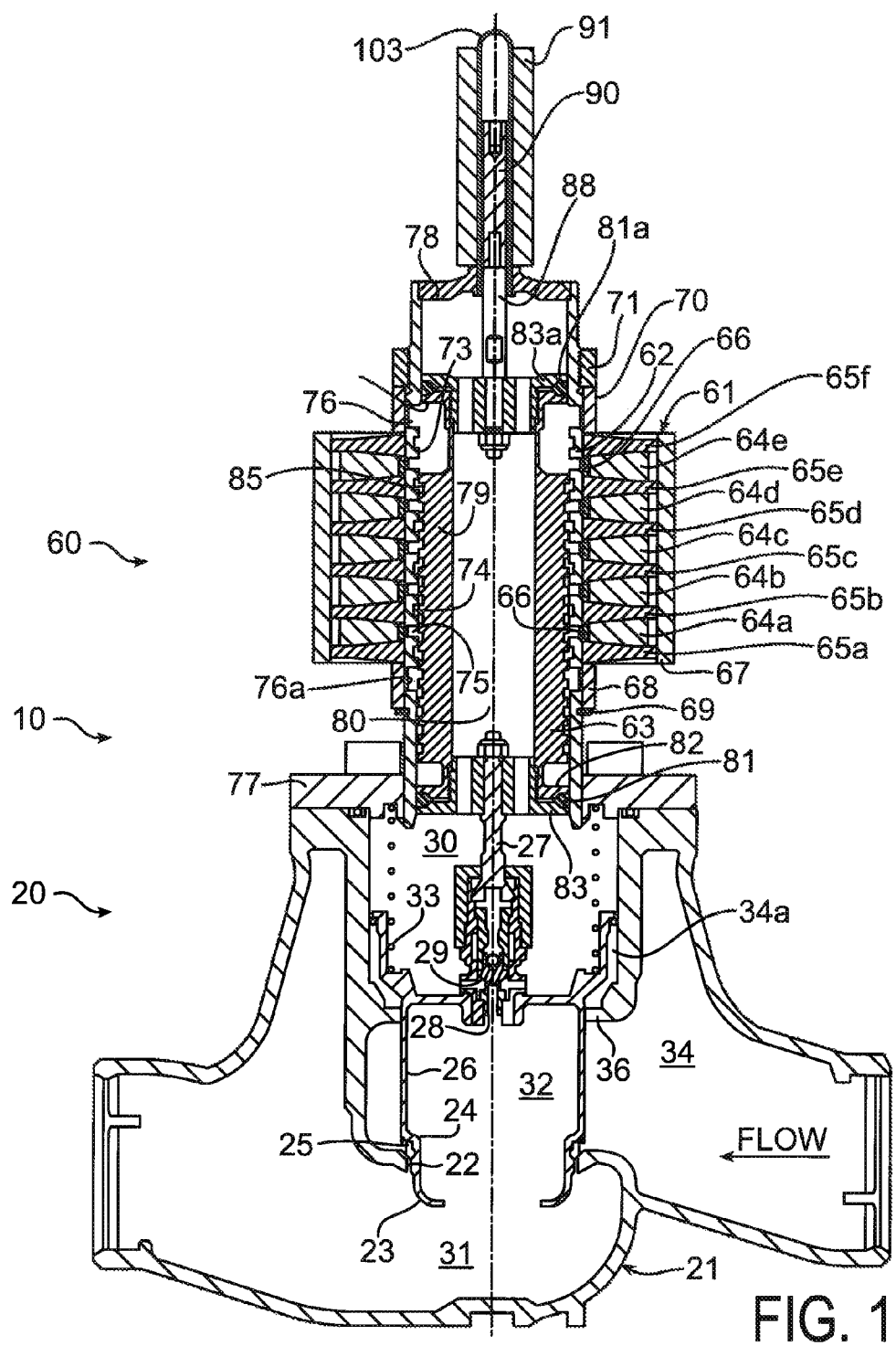
FIG. 1 is a cross-sectional view of an embodiment of a linear motor valve assembly in accordance with the present invention.

FIG. 1 is a sectional view of an embodiment of the linear motor valve assembly 10 of the present invention comprising a sealed linear motor 60 with a two-way valve assembly 20. The sealed linear motor 60 includes a removable stator coil assembly 61, a toothed tube assembly 62, and a cylindrical slider 63 hermetically connected to a two way valve body assembly 20. The stator coil assembly 61 comprises a plurality of copper wire wound toroidal coils, 64a, 64b, 64c, 64d and 64e, a plurality of magnetic steel stator discs, 65a, 65b, 65c, 65d, 65e and 65f, a plurality of non-magnetic spacer rings 66 soldered or bounded to the stator discs 65. An inner diameter of the stator discs 65 a-f fits closely around the toothed tube assembly 62. A steel stator cover 67 fits tight to the outside surface of discs 65 for better magnetic flux flow. The outside surface can be a close tolerance smooth surface or it can be knurl machined with an interference fit or any other suitable configuration. It is possible to achieve greater tightness by utilizing a heated stator cover 67 to achieve a shrink fit during assembly. Outside of the stator coil assembly 61, a lower stator support ring 68 and a snap ring 69 and an upper stator holding ring 70 with a stator locknut 71 serve to keep the stator coil assembly 61 in an optimum longitudinal position.

The steel toothed tube assembly 62 may have a 16 rms smooth and close tolerance machined outside diameter cylindrical surface, a cylindrical series of rectangular cross-section equally spaced internal teeth 73, a rectangular small groove 74 in the middle of each tooth, a deep rectangular groove 75 between each pair of teeth, and thin walled magnetic stop grooves 76 and 76a at the extreme ends of the groove array. The inside tube diameter of the toothed tube assembly 62 may be 16 rms smooth machined to a dimensional tolerance of about plus or minus 0.001 inches. Stainless steel or steel tube adapter 77 may be welded to the bottom of the toothed tube assembly 62, stainless steel or steel tube cover 78 may be welded to the top of the tube assembly 62, and non-magnetic steel sensor tube 103 may be welded to the tube cover 78.

The slider assembly 63 includes the slider cylinder 79, which has a hollow center 80 and two adjustable slider rings 81 and 81a. It also has two rings spaces 82 and 82a which are confined by two metal bearing adjuster screws 83 and 83a, which are threaded into the slider assembly 79. The slider cylinder 79 has a series of grooves 85 on its outside diameter. The outside diameter is machined to be approximately 0.005 inches smaller than the inside tube diameter of the toothed tube assembly 62. The upper bearing adjuster screw 83a has a filtering screen disc (not shown) and a sensor stem 88 is positioned within the sensor tube 103 with a nut and which supports magnetic sensor coil or slug 90. The lower bearing adjuster screw 83 connects to rod 27 held in place by a nut 89. The slider rings 81 and 81a are able to achieve a concentricity of less than 0.001 inches between the inside of the toothed tube assembly 62 and the outside of the cylindrical slider assembly 79. The electronic pick-up coil 91 is positioned on the sensor tube 103 in order to control the steps and the location of the slider assembly 63.

The stator coil assembly 61 not only acts magnetically upon the toothed tube assembly 62 and the cylindrical slider assembly 79, but being of great radial strength and being closely fit around toothed tube assembly 62, it greatly increases the pressure bursting strength of the toothed tube assembly 62 and thereby, permits the accommodation of very high pressure fluids inside of the sealed linear motor 60.

The design of the stator coil assembly 61 facilitates the easy and efficient winding of coils 64 a-e by temporarily assembling the steel stator discs 65 a-f together by means of soldering or bonding the spacer rings 66 to the stator discs 65. This assembly can be placed into a coil winding machine whereby all of the coils can be wound before the stator cover 67 is installed and prior to placing the stator coil assembly 61 upon the toothed tube assembly 62. The two wires from each coil can be individually routed via a slot which vertically traverses the entire length of stator cover 67 to exit the stator coil assembly 61 and electrically connect with operating and positioning controller 101.

The maximum lifting force capability of this linear sealed motor valve is limited by the level in amperes of direct current which will not cause overheating, which for a reasonable sized motor to typically operate a two inch port diameter balanced seat design valve would be about two amperes. An appropriate reasonable size and weight motor would be about three inches long. A maximum temperature level in typical surrounding ambient of 30 degrees Celsius would be 130 degrees Celsius. This limits the size of coils 64 to about 200 turns of no. 26 insulated motor winding wire. In order to achieve reasonably fine control of the motor position, the individual steps should be about 0.05 inches. Assuming a total movement of 0.8 inches, which is reasonable for valves from one inch to three inches in size, 16 total steps would be needed. This could be four 0.054 inch steps of the slider assembly repeated four times giving a total of 16 steps or about 0.86 inches maximum travel. To achieve this with slider teeth of 0.105 inches with 0.105 inch grooves, the tube teeth should be 0.342 inches wide with 0.133 inch spaces between. This establishes an available longitudinal length at a radial location close to the teeth for the toroidal coil plus the stator disc of 0.475 inches. Usage of this space for magnetic flux optimization can have dimensional and shape variations. For example, the stator disc might be tapered and yet keep constant radial cross-section for the flux path, thereby permitting more coil windings. Similarly, the coil bobbin can be eliminated by designing the stator discs into multiple spools for direct wire winding with no bobbins needed, thereby permitting more space for wire turns.

Referring again to FIG. 1, one embodiment is shown to lie in a two-way modulating valve body assembly 20 which is used to control the flow of all types of fluids by virtue of valve body 21 which has a seat orifice 22 that is obscured to a variable degree by a parabolic plug 23. Total closure to flow is the result of plastic sear ring 24 sealing against conical seat surface 25. Rod 27 is connected to an adjuster screw which is threadably connected to slider assembly 63. A pressure balancing piston 26 is lifted by rod 27 which also opens pilot orifice 28 by nearly simultaneously lifting plastic pilot seat 29. The pressure in piston chamber 30 is exhausted to valve outlet 31 via piston interior 32. The piston 26 contains a bleed hole 33 which permits the piston to drop via rising pressure in piston chamber 30 which is receiving higher pressure from upstream 34 and annular chamber 34a. The piston 26 is axially guided by plastic seal 35 and slide fitting guide bore 36.

Figure 2:
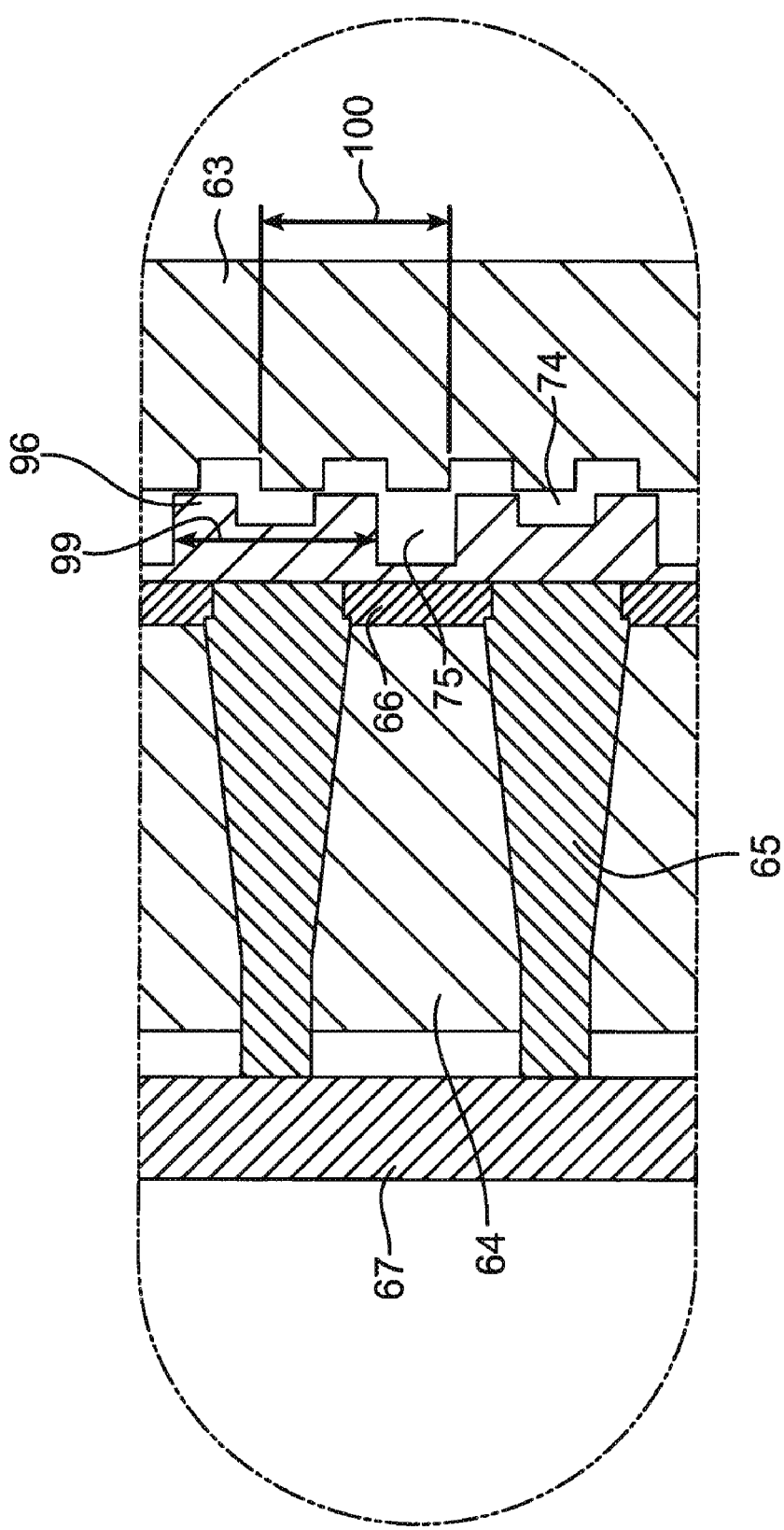
FIG. 2 is a detail view of the toothed interface of the stator assembly as shown in FIG. 1.

FIG. 2 shows a close-up of a FIG. 1 detail of the stator assembly cross-section. The greater width 99 of tube teeth pair 96 compared to slider teeth pair 100 facilitates the stepping of slider 63 with respect to toothed tube assembly 62 as the current to stator coils 64 is sequenced.

Figure 3:
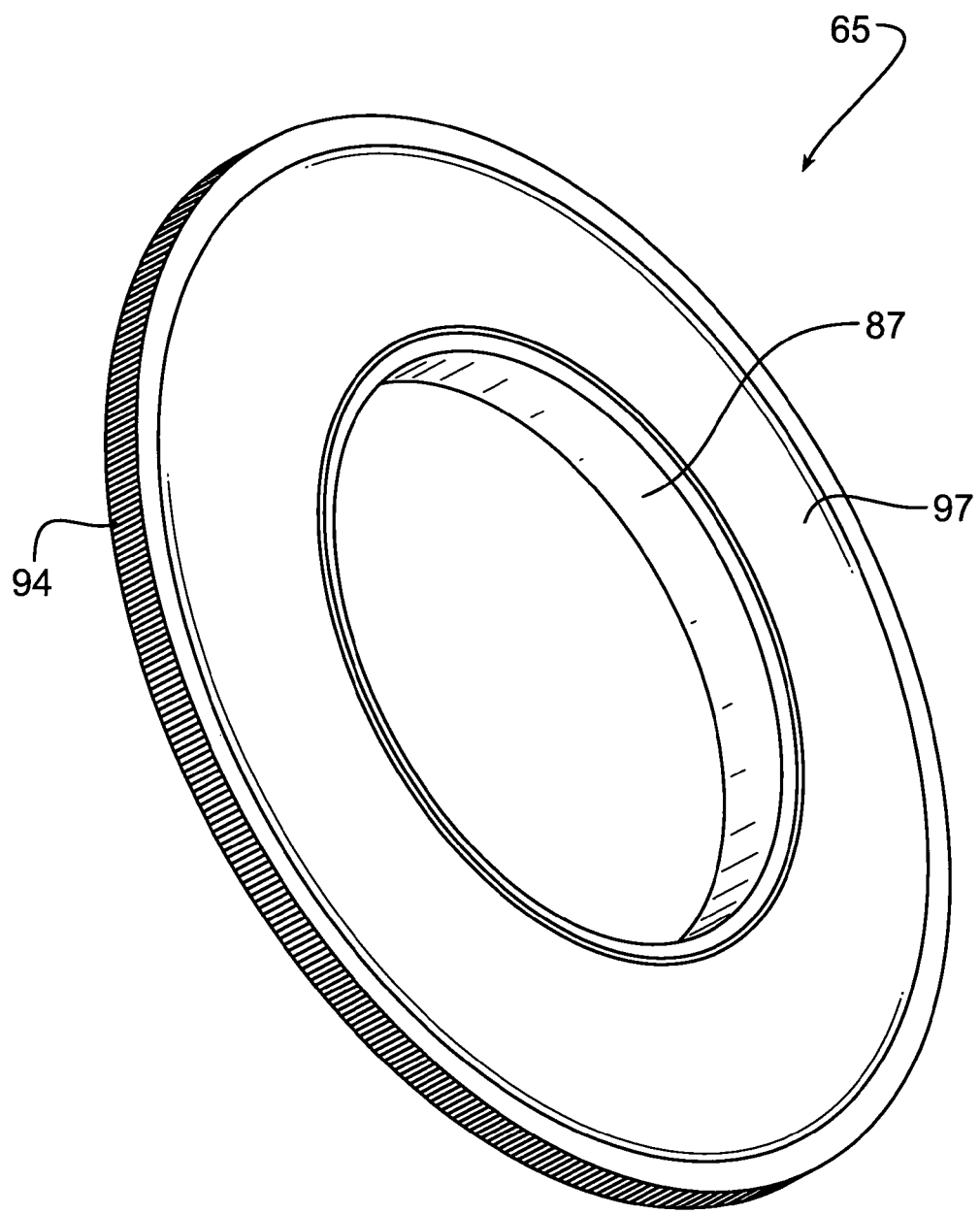
FIG. 3 is a perspective view of a stator disc of the type shown in FIG. 1.

FIG. 3 shows stator disc 65 with knurled outside surface 94 and close fitting inside diameter 87 and disc conical surface 97. The faces of the stator discs receive the lines of force from the disc coils which are then radially transmitted toward the central teeth of the toothed tube. Since coil electrical lines of force are distributed over the face of the disc, the radial cross-section of the disc can remain constant. This is achieved by increasing the disc thickness in inverse proportion to its diameter, which is in actuality a linear tapered shape as shown in FIG. 3. This tapering design allows more space for coil turns of wire, thereby increasing motor forces without resorting to extreme high temperatures.

Figure 4:
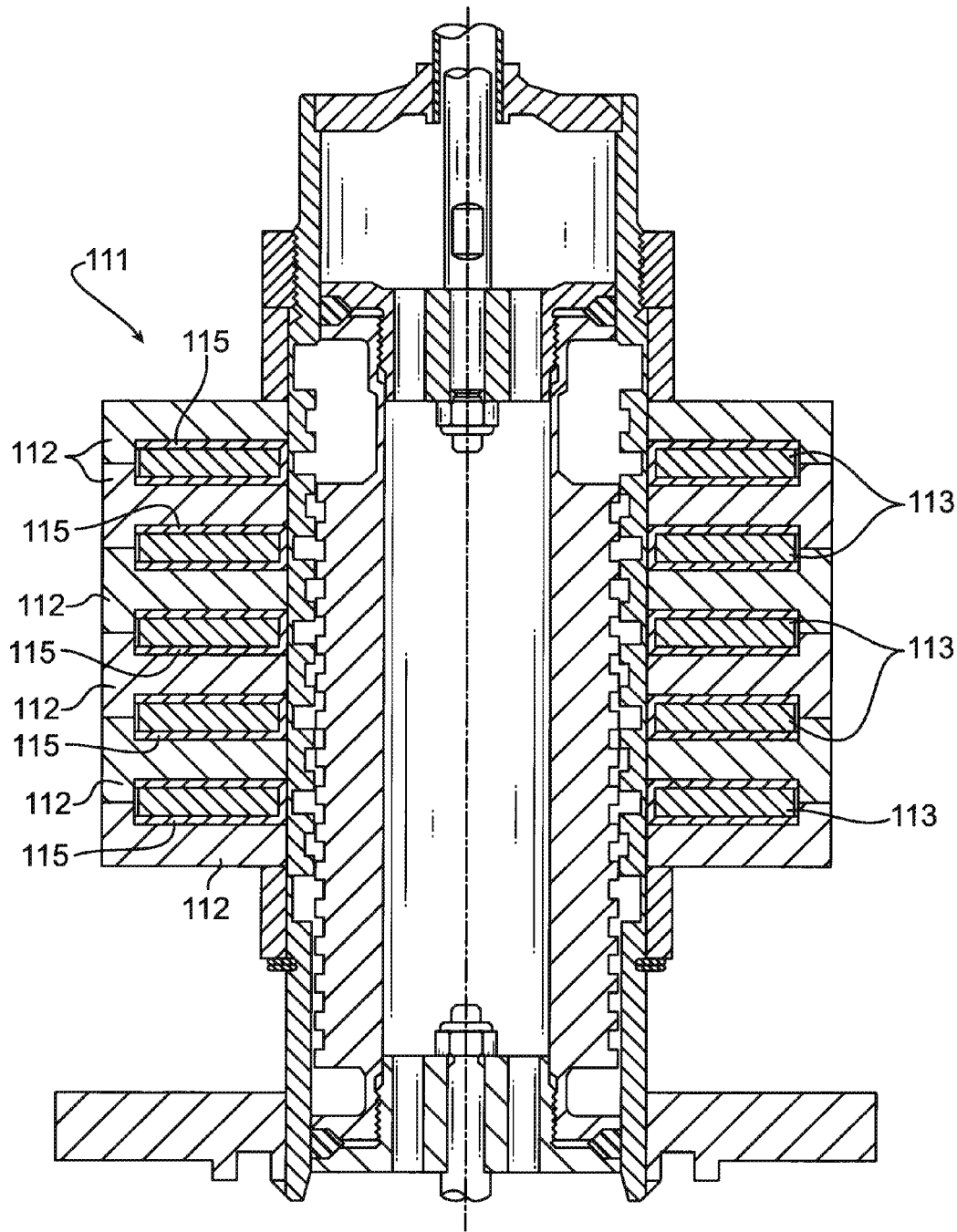
FIG. 4 is a cross-sectional view of an alternative embodiment of the stator coil assembly of a linear motor valve assembly in accordance with the present invention.

FIG. 4 shows the invention with an alternative coverless stator coil assembly 111. By using flanged-perimeter stator discs 112 it is possible to eliminate stator cover 67. Since it would be impossible to herewith wind the toroidal coils 64 from the closed periphery, separate toroidal coils 113 would be individually wound on spool type bobbins 115.

Figure 5:
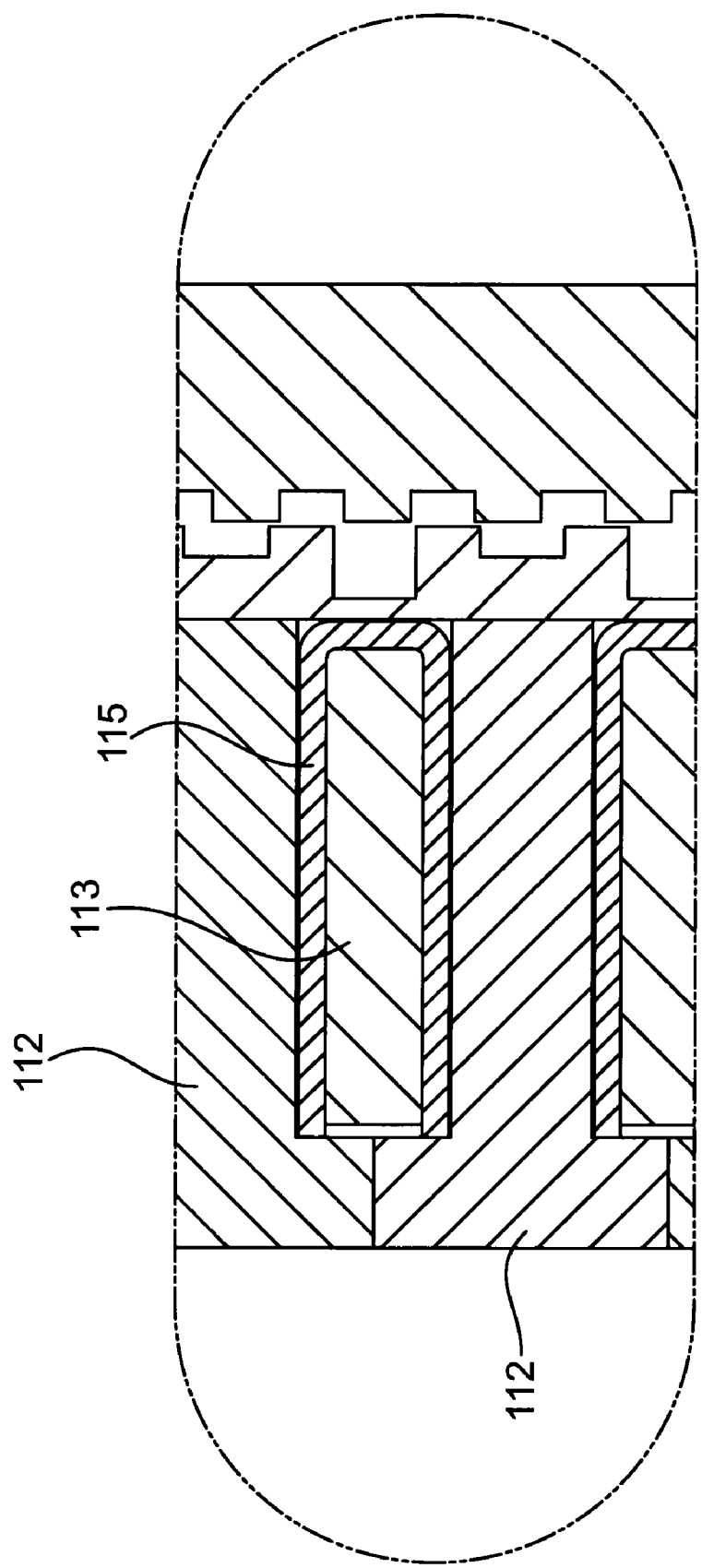
FIG. 5 is a detail view of the stator assembly as shown in FIG. 4.

FIG. 5 shows a close-up section of FIG. 4. The coil wires from these bobbins would exit through slots in the flange of stator discs 112. The stator discs 112 and separate bobbin wound coils 113 are held together after assembly by simple brackets with long screws and nuts (not shown).

Figure 6:
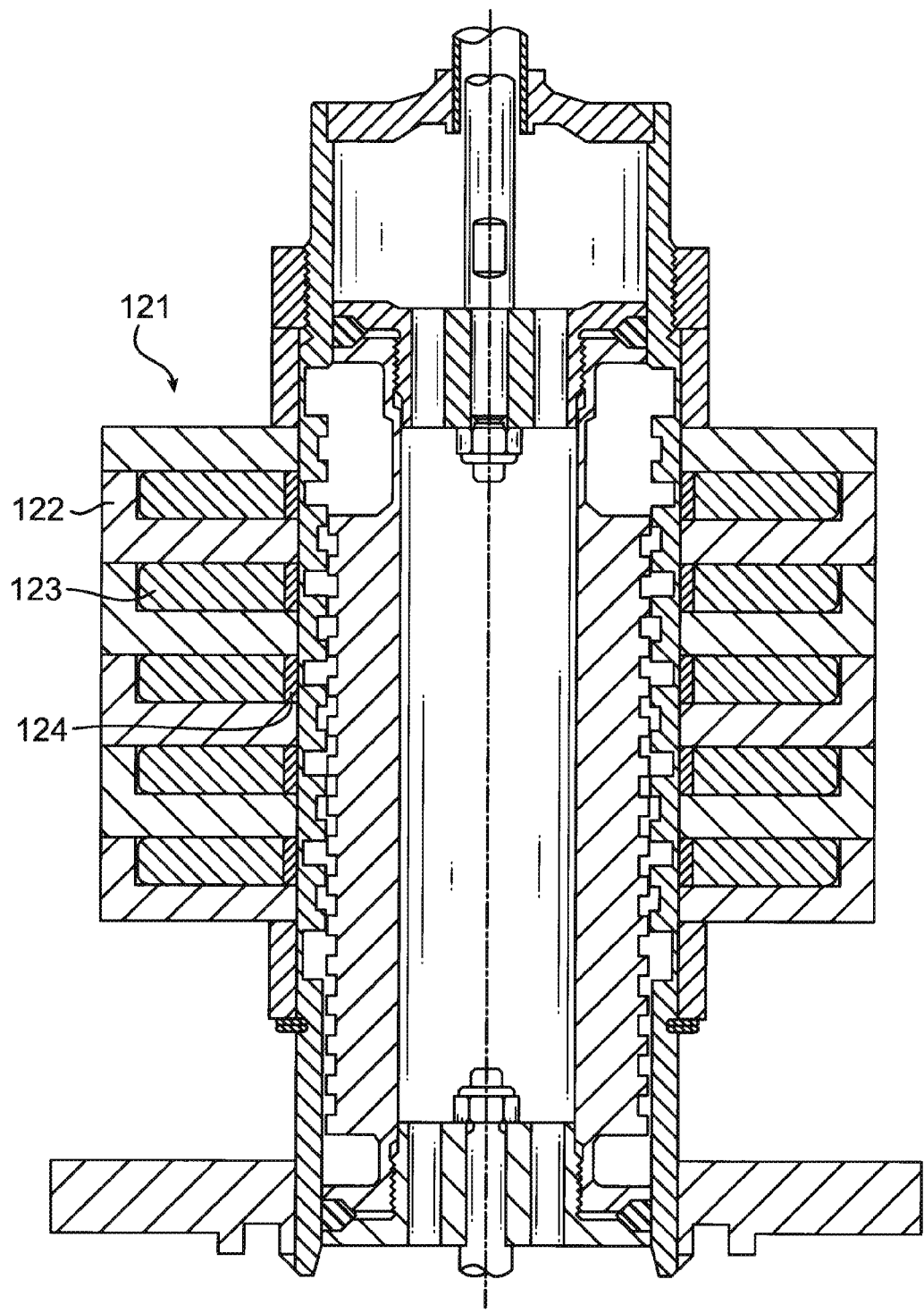
FIG. 6 is a cross-sectional view of another alternative embodiment of the stator coil assembly of a linear motor valve assembly in accordance with the present invention.
Figure 7:
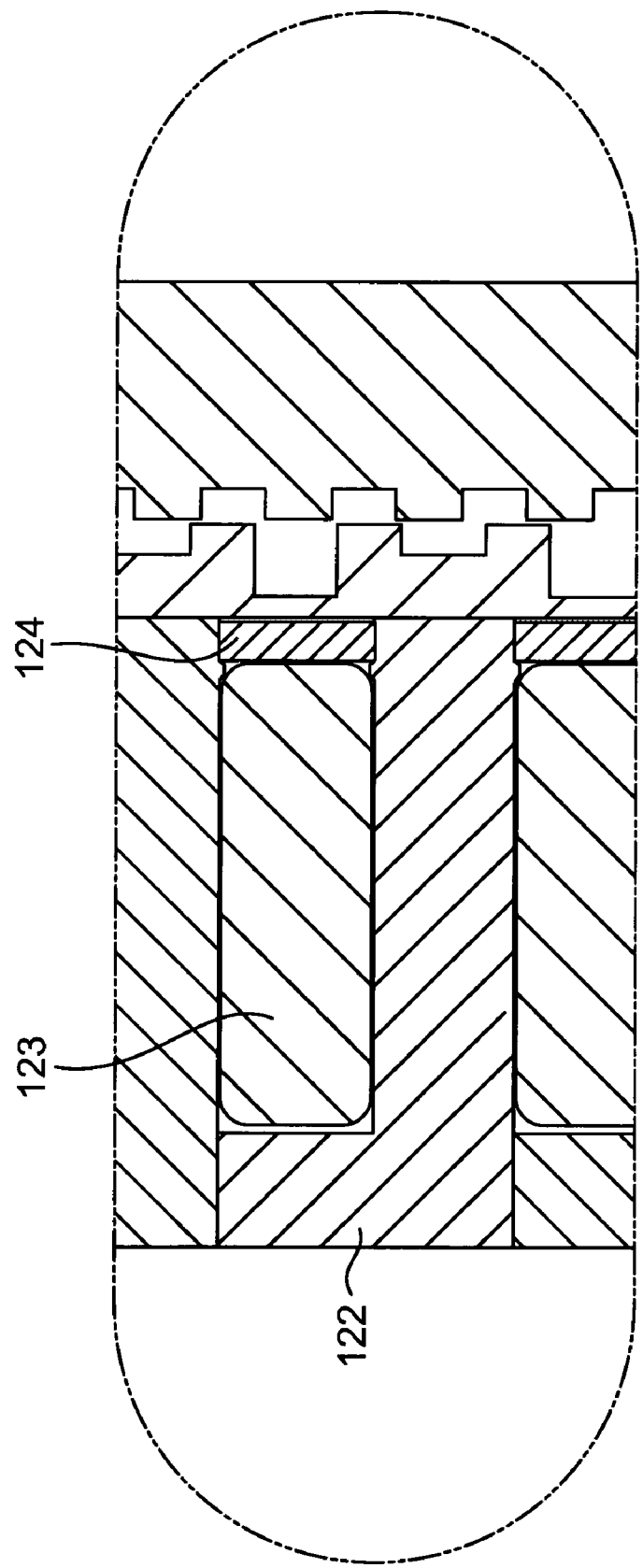
FIG. 7 is a detail view of the stator assembly as shown in FIG. 6.

FIG. 6 shows the invention with another coverless stator coil assembly 121. By using shallow cup shaped stators 122, it is possible to eliminate stator cover 67. In addition, the cup shape permits the use of self-contained bobbinless coils 123 which facilitates the use of more wire turns in the same cup space. To help support and retain bobbinless coils 123, an internal ring 124 is installed at the interior diameter of the stators 122, which are shown in detail in FIG. 7. This internal ring may be made of heat resistant plastic or non-magnetic metal.

The operating principles which are utilized for design of this linear motor valve are based upon magnetic lines of force tending to minimize their effective closed path length. This path is related to the measurable reluctance of the circuit. If one or more movable magnetic parts form a portion of the path or reluctance of the circuit, there will be magnetic forces exerted upon the movable part to change its location or orientation in a manner which minimizes the circuit's magnetic resistance. If a movable magnetic part, such as a cylindrical slider in this case, is subject to a change in the reluctance circuit, as by changing an electrical field with in the magnetic circuit, the part will receive forces which tend to reposition it so that the newly affected reluctance circuit is minimized.

Figure 8:
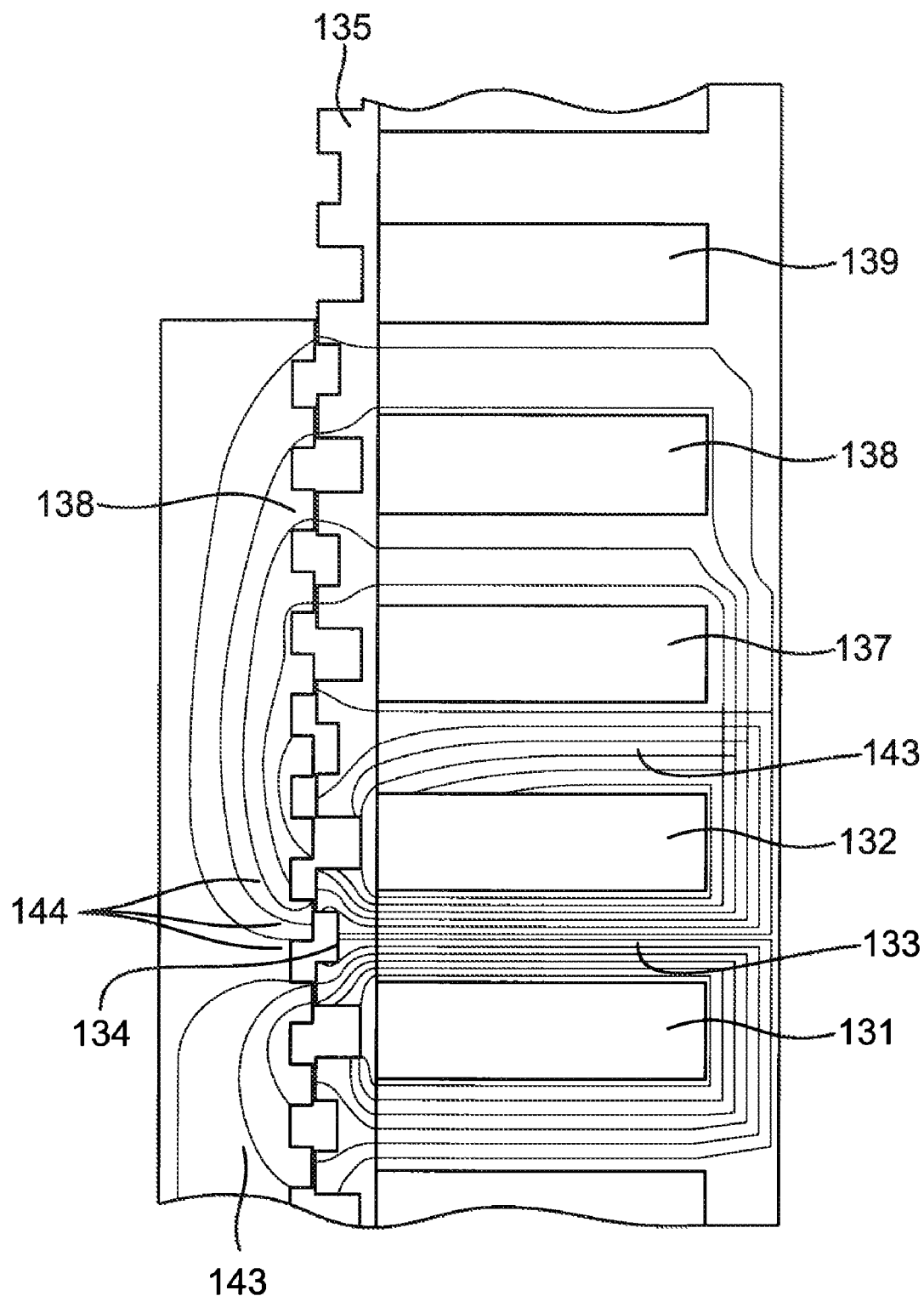
FIG. 8 is a density plot of magnetic flux levels in the motive force regions of the linear motor valve assembly as shown in FIG. 7 for the first motor step.

Referring now to FIG. 8, the graphical magnetic flux levels in the motive force regions of the sealed motor valve for the first motor step are shown. The highest flux concentration level of 1590 Tesla is in that disc which is in between the two energized toroidal electrical coils 131 and 132. The flux lines are shown streaming between the internal teeth 134 of the toothed tube 135 and the external teeth 136 of the slider 143. The flux forces tend to line-up the opposing teeth in the principal flux region 144, thereby exerting an axial and upward moving force upon the slider 143.

Figure 9:
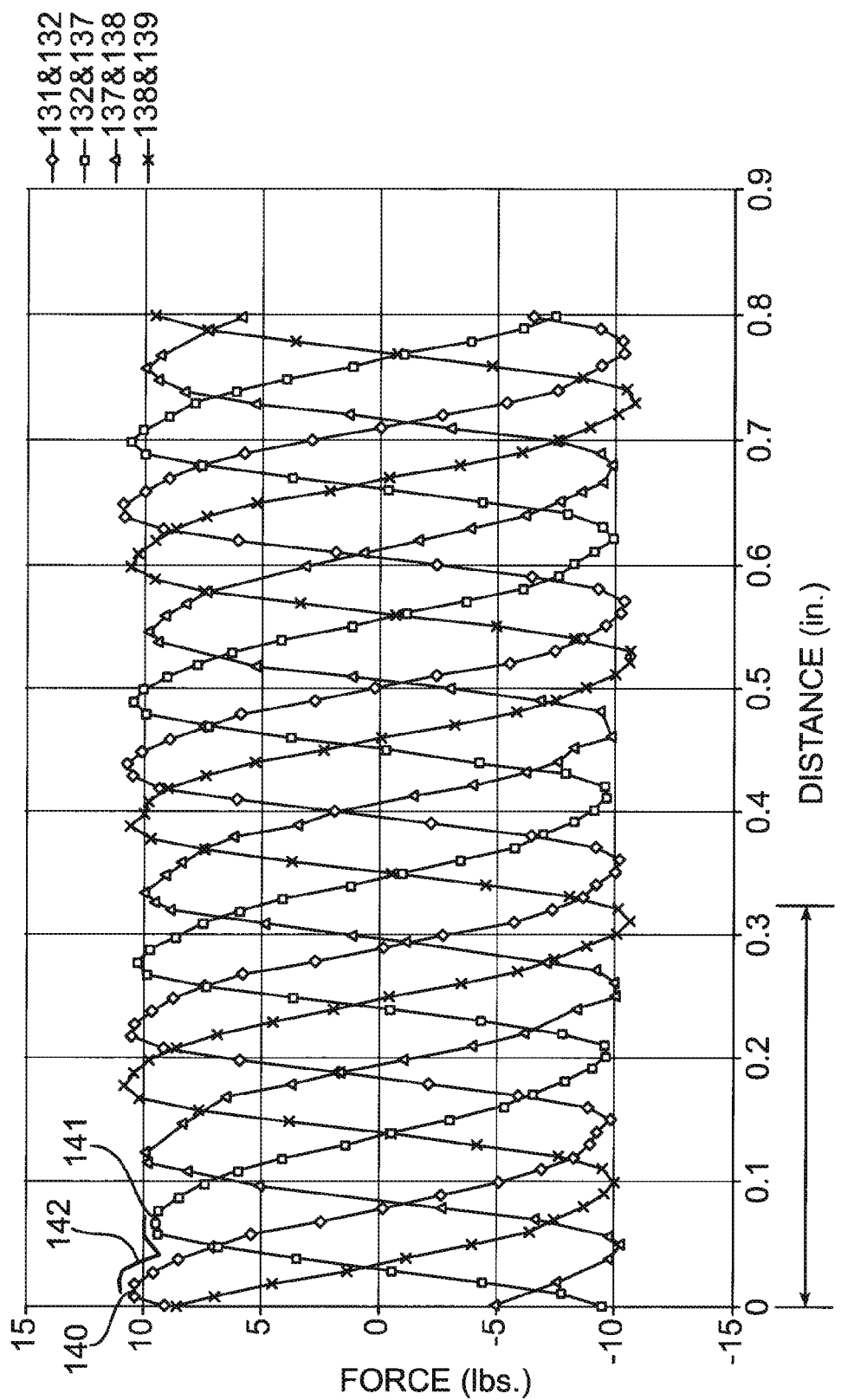
FIG. 9 is a graph showing the gross force in pounds exerted by the stator assembly and toothed tube assembly combination upon its slider position for a single pair of energized coils per curve.

FIG. 9 show the gross force in pounds exerted by the sealed linear motor stator assembly and toothed tube assembly combination upon its slider position for a single pair of energized coils per curve. The leftmost full curve 140 shows force versus position for only coils 131 and 132 being energized. The maximum force occurs in this case about 0.015 inches from the established slider starting point. This peak force location will be the position which the slider assumes because every other possible position exerts less force upon the slider. The other force curves do not actually exist at this time because all other toroidal coils are de-energized. When coils 131 and 132 are de-energized and coils 132 and 137 are energized, the operating force versus distance curve becomes 141 and the pertinent stator disc is 143. The maximum force now occurs about 0.07 inches from the start. If the external opposing force load on the slider is near to the maximum available force shown, it may be necessary to gradually reduce the total current in the coil pairs 131 and 132 while increasing the total current in the coil pairs 132 and 137. This causes the motive force upon the slider 143 to move from the first curve peak to the second curve peak along transfer curve 142.

The same motive force dynamics will occur as successive coil pairs are de-energized until coils 138 and 139 are energized, at which time the slider has reached a distance of 0.2 inches from the starting point. Accordingly, changing the reluctance circuit by altering electrical force fields from the coils will cause forces to be exerted upon the slider to move it to a new minimum reluctance value. Manipulating the current to the electrical coils within the linear motor can thereby cause the slider to move accordingly.

To continue moving the slider further, it is necessary to repeat the four time coil pair energization schedule as described above. Each repeat of the cycle will move the slider 0.2 inches; so, typically repeating the cycle four times will move the slider by 0.8 inches, which would by typical for a 1" to 3" valve series.

Figure 10:
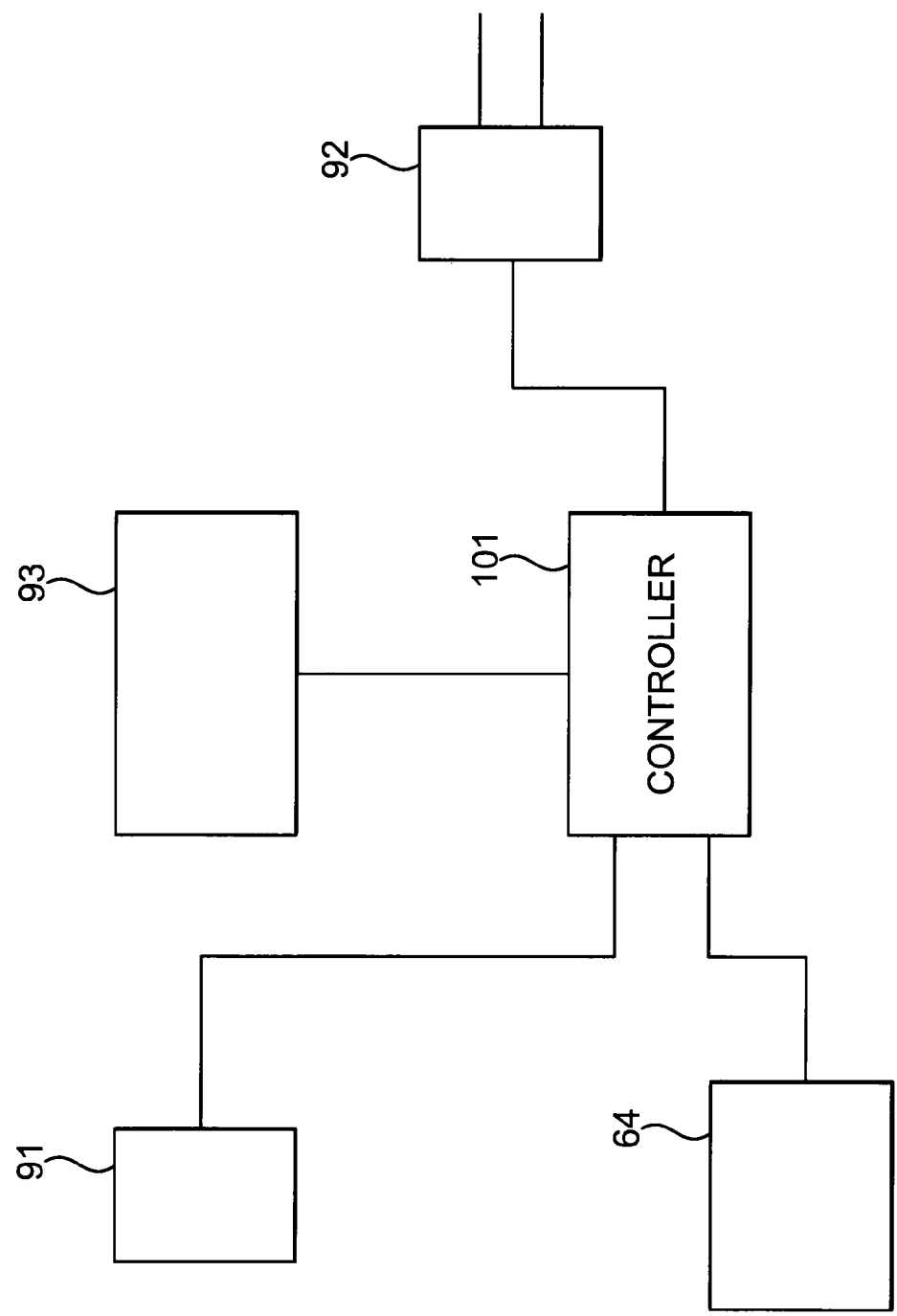
FIG. 10 is a schematic diagram of an embodiment of a controller system for the linear motor valve.

Referring to FIG. 10, the power supply 92 converts available electrical power to regulated direct current having controlled voltage. Motor coils 64, each having two leads, are individually connected to the operating and positioning controller 101. The slider location sensor pick-up coil 91 transmits to the controller 101 an electrical signal which indicates the precise location of linear motor slider assembly 63. The operating and positioning controller 101 sends digitalized electrical stepping pulses to the motor coils for linear motor slider movement. The controller receives data from the input signal source 93, which could be a thermostat, pressure transducer, programmable logic controller, PID controller, computer or other system and accordingly position the slider assembly 63 and connected valve seat or other final control element. This configuration features strong magnetic pulsed steps of lifting force which can open the valve seat port in small increments. The opening and closing steps are actuated by feedback from a linear valve seat position transducer which, via a controller, provides direct current pulses to the armature spool coils to move the valve seat within the valve body housing. A lower current level can be used to hold the seat in fixed position while removal of voltage and current permits the valve seat to close.

The present invention has advantages over conventional solenoid valves, which are actually simplistic motorized valves, in that this invention has much greater lifting forces for the same electrical amperage and power and can consequently open a certain size valve seat at higher pressure differences; likewise, for the same pressure difference it can open a seat of larger port size. In addition, this invention can lift a valve seat in incremental steps whereas a conventional solenoid valve is only either fully closed or wide open. Modulating lifting of conventional solenoid valves has been unsuccessful because of low and uncontrollable lifting forces and positioning ability. However, unlike most motorized valves, this invention and most ordinary solenoid valves have the advantage of moving naturally by spring force or gravity to the closed port position when electrically de-energized.

An alternative design for the internal teeth which eliminates the internal boring of such teeth can also be provided. A simple smooth, straight interior hole can be achieved by using a simple straight drill or reamer or by using round steel tubing. The teeth can be a series of separate magnetic steel washer type grooved rings whose outer diameter is a slight interference fit into the reamed hole or round tubing. Such interference contact provides a good magnetic path into each washer type internal tooth provided each tooth is aligned with the stator discs. If interference construction is too exacting to be economical, the washer can have a radial slot to create a spring-force-like contact within the enclosing reamed hole or tube. Such slot would have negligible obstruction of the magnetic flow path from the stator discs.

Because the longitudinal position of the teeth must be accurate to achieve adequate force for each linear motor step, it is necessary to precisely position the tooth washers into the reamed hole or tube. This can, in one instance, be achieved by a calibrated mandrel on a manual arbour press or a similar hydraulically operated linear press. The linearly deepest tooth washer is installed first followed by the properly spaced remaining tooth washers. In addition to being of proper diameter, the tooth washers must be of uniform and accurate width.

An alternate method of achieving the tooth washer array is to achieve spacing by using non-magnetic spacer washers made of materials such as aluminum, copper, 300 series stainless steel, or suitable plastic. These non-magnetic spacer washers are uniform and precise in thickness. Outside diameters are a close but not interference fit into the toothed tube assembly's reamed hole or tube. Their inside diameters are greater than the inside diameter of the magnetic material tooth washers and also thereby greater in diameter than the teeth of the slider assembly. This permits the slider to move freely within the toothed tube assembly as guided by bearing sleeve inside diameter and plastic bearing rings to maintain a radial clearance of 0.005 to 0.015 inches between the slider and the toothed tube teeth.

Winding wire coils directly onto the stator discs and spacers eliminates the need for plastic coil bobbins which consequently provides more wire turns for the linear motor. The tapered stator discs are coated with a spray-on insulating film or covered with a cemented thin insulating plastic sheet of nylon, Mylar, or similar material. The discs can also be machined with a radial groove which can be utilized for protection of the lead-in coil wire.

Figure 11:
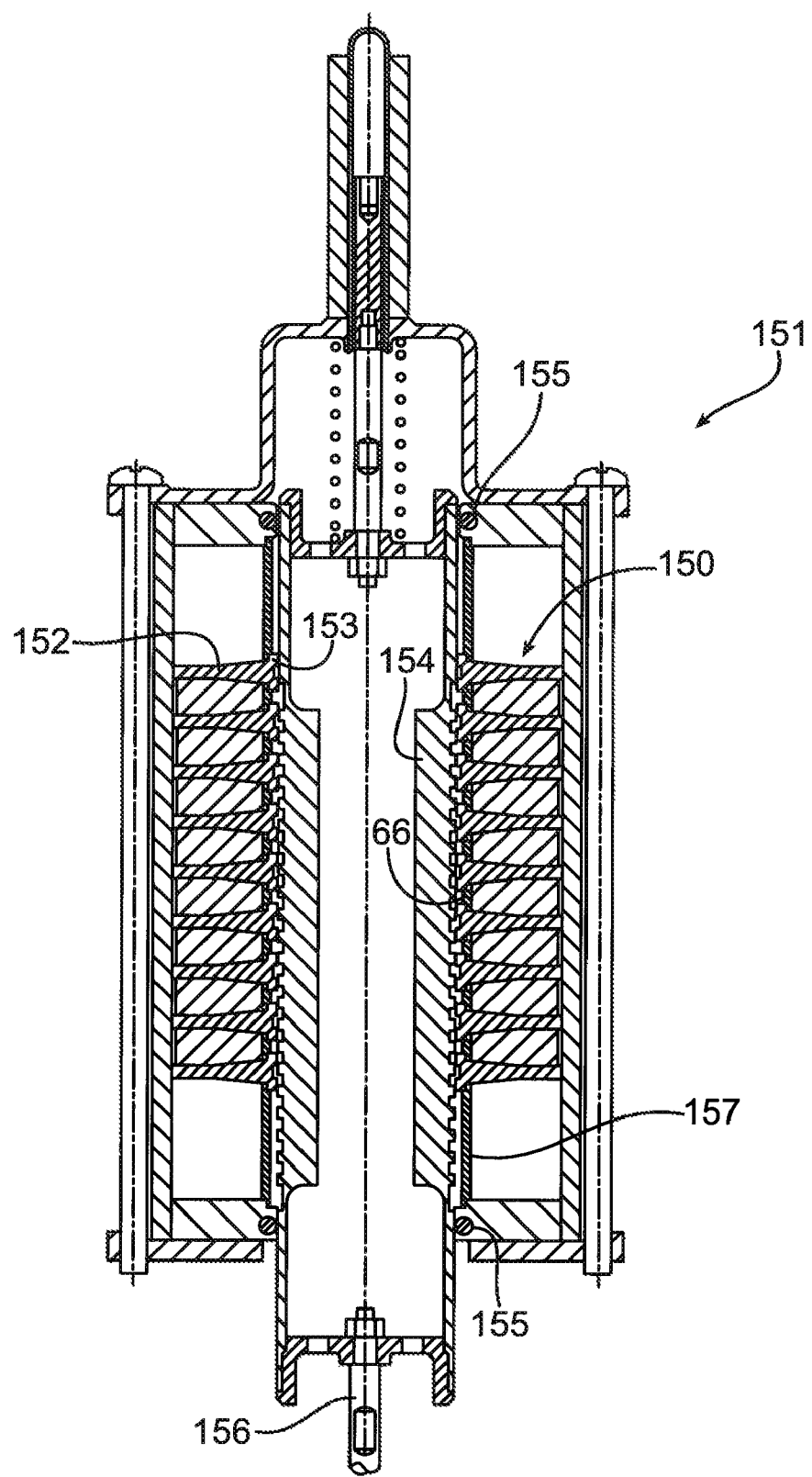
FIG. 11 is a cross-sectional view of a fourth alternative embodiment of the stator coil assembly of a linear motor valve assembly in accordance with the present invention.
Figure 12:
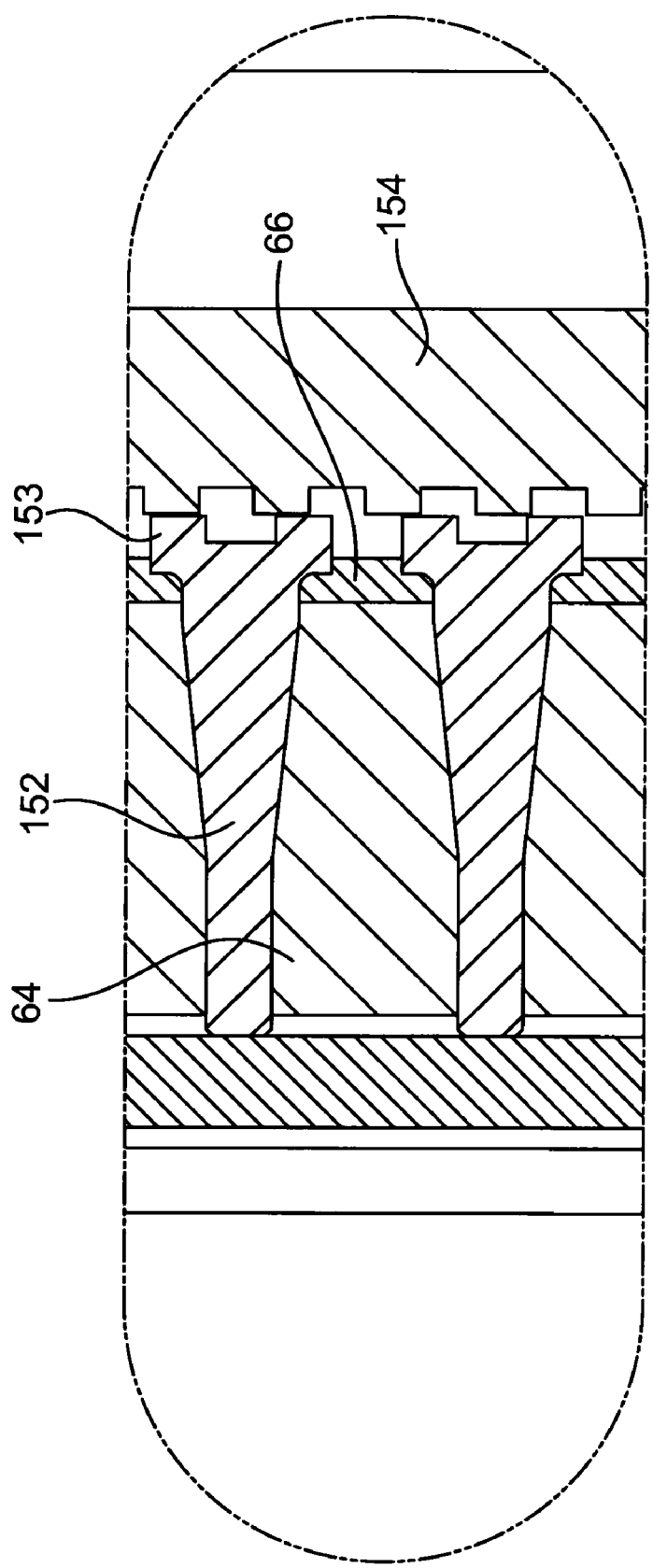
FIG. 12 is a detail view of the stator assembly as shown in FIG. 11.

FIG. 11 shows a simpler linear motor to operate valves, linkages, and other devices but which, however, is not sealed in a manner which permits the electrical stator assembly 150 to be removed as an assembly from the linear motor 151. The toothed stator disc 152 contains the integral stator tooth 153. The slider assembly 154 is centrally guided by bearing-seals 155. The motor linkage stem 156 can be connected to valve stems or other devices such as air dampers, throttles, brakes, and other functional devices. The electrical coils cannot be removed from the linear motor assembly but they can be plastic-potted in place because the discs are all welded or soldered together by the spacer rings 66 and extension rings 157. The detailed shape of toothed stator disc 152, the spacer rings 66, the electrical coils 64, and the slider assembly 154 are shown in FIG. 12.

An alternate configuration to the coil as shown in FIG. 2 is shown in FIGS. 13A and 13B, wherein a wiring groove 158 is machined into the face of the stator disc 65 to permit routing of the return wire 159 to the perimeter of the stator without bulging the coil wire turns with resultant wire insulation coating potential damage. Additional wire protection is achieved by an insulating coating or a cemented film bonded to the stator discs 65 and spacer rings 66.

Figure 14:
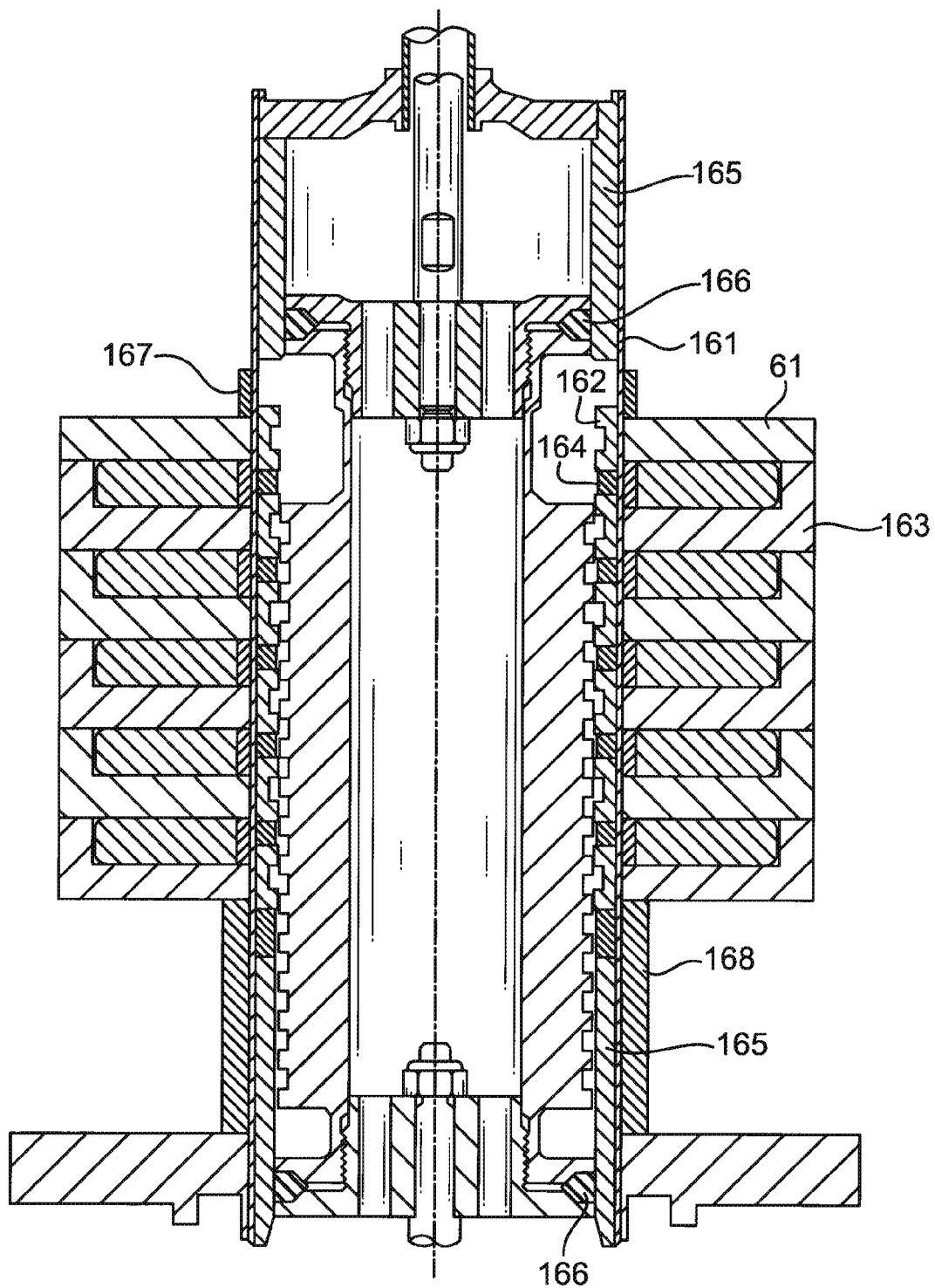
FIG. 14 is a cross-sectional view of a fifth alternative embodiment of the stator coil assembly of a linear motor valve assembly in accordance with the present invention.
Figure 15:
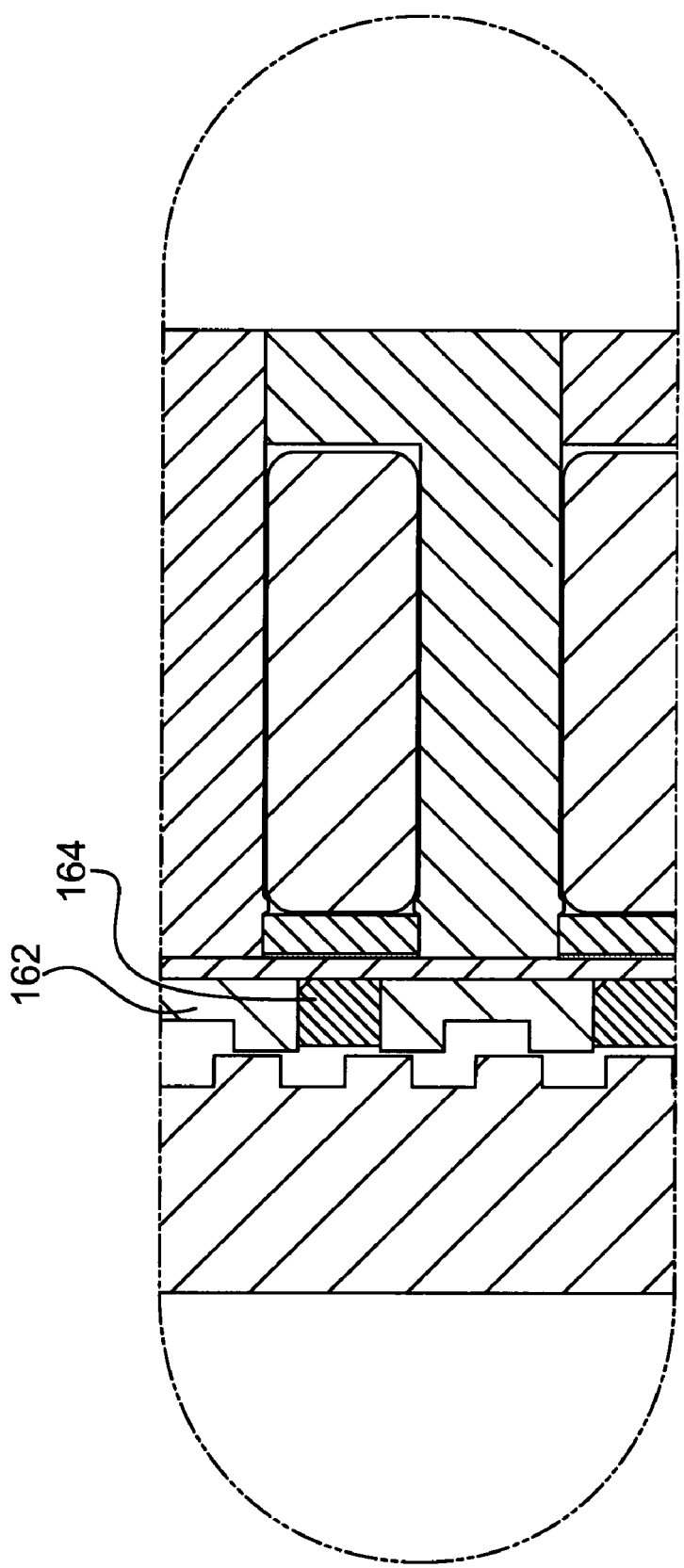
FIG. 15 is a detail view of the stator assembly as shown in FIG. 14.
Figure 16:
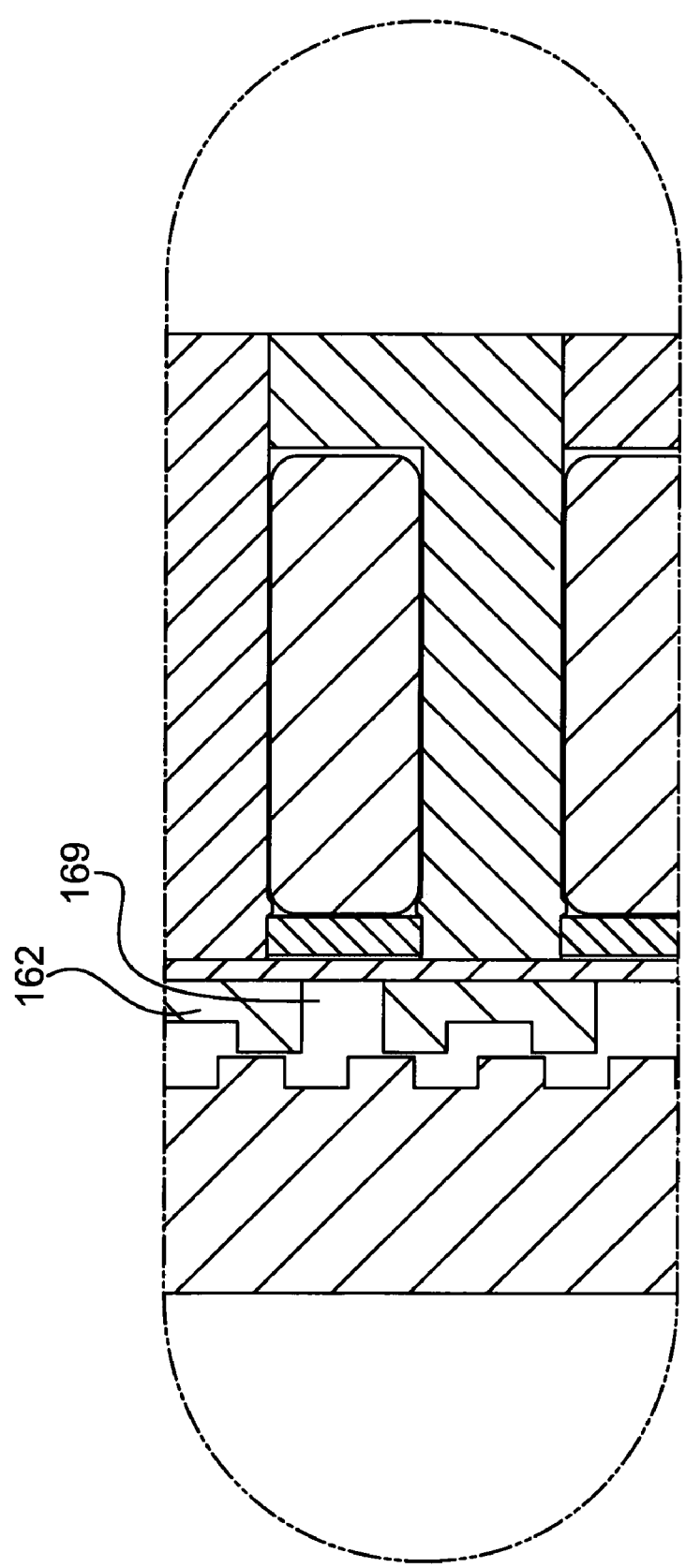
FIG. 16 is a detail view of an embodiment of the stator assembly as shown in FIG. 15, but with an air space instead of a non-magnetic spacer washer.

A more easily machined version of the toothed tube assembly is shown in FIG. 14. A straight walled round tube 161 is tightly fit into stator coil assembly 66. Stator teeth rings 162 are tightly located inside of the straight walled tube 161 at positions in line with the inside diameter of the disc sections 163 of the stator coil assembly 61. Optional stator disc rings 162 are alternatively positioned by the non-magnetic washers 164 (shown in detail in FIG. 15 and without rings 162 in FIG. 16). Bearing sleeves 165 are made on non-magnetic stainless steel and have polished precision internal diameters to guide Teflon bearings 166. A spring clip 167 keeps the stator coil assembly 61 in a fixed position as located by position ring 168.

The sealed embodiment of the valve of the present invention provides an advantage over existing sealed type electric rotary motor operated valves in its ability to naturally move to a closed position when de-energized without the need for a battery power back-up or a capacitance power back-up system. This invention also avoids the need to convert rotary motor motion into linear valve seat motion via the use of screw threads or gear teeth. This invention conveys pulses of magnetic forces through the toothed tube to directly lift the valve seat open without the use of any whatsoever motion converting linkages. It is noted that in one embodiment of this invention, the electrical parts are outside of a toothed magnetic tube while the shaft which operates the valve seat or other flow control part is located inside of the tube.

As discussed above, at least one embodiment of this invention provides a sealed linear stepping motor operator whose hollow cylindrical slider is located concentrically inside of a magnetic material, internally toothed round tube which hermetically isolates it from a surrounding, close fitting cylindrical stator assembly consisting of a series of toroidal wound wire electrical coils which are sandwiched with a corresponding series of magnetic steel rings. The slider, which has external circular teeth, can be located within a sealed, pressurized or evacuated fluid containing space connected to the tube while the electrical stator is outside of such space. The slider can be utilized to move such things as valve seats, pistons, rods, or similar mechanical parts by small increments in response to electrical stepping pulses of the stator coils as controlled by an electronic operating and positioning system which includes a slider location sensor. The slider can be returned by a spring to a starting position upon halting the electric current flow to the stator assembly.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:
1. A valve comprising:
a valve body having spaced inlet and outlet ports separated by an intermediate valve seat in open communication with the inlet and outlet ports;
a piston reciprocable within a bore in the valve body;
a valve member being adapted to sealingly mate with the valve seat;
a biasing member for normally biasing the valve member toward the valve seat;

a linear motor assembly attached to the valve body, the linear motor comprising a plurality of stator discs, a plurality of stator coils, and a plurality of teeth defining a cylindrical opening, a slider positioned within the cylindrical opening, the slider having a plurality of teeth defining a generally cylindrical outer periphery of the slider, the outer periphery of the slider being smaller than the cylindrical opening, the slider being movable in a stepped manner in response to magnetic flux generated by electrical current passing through successive stator cores, wherein an interior hollow portion of the slider is hermetically sealed from the generally cylindrical outer periphery of the slider.

2. The valve of claim 1, wherein the plurality of teeth defining a cylindrical opening are formed on the interior cylindrical surface of a tube member.

3. The valve of claim 1, wherein the plurality of teeth defining a cylindrical opening are formed as a portion of each stator disc.

4. The valve of claim 1, wherein each stator disc is separated from adjacent stator discs by a spacer.

5. The valve of claim 1, wherein the piston is coupled to the slider.

6. The valve of claim 1, wherein the valve member is coupled to the piston.

7. The valve of claim 1, wherein the stator coils are wound on spool-type bobbins.

8. The valve of claim 1, further comprising a linear position sensor coupled to the slider.

9. A valve comprising:
- a valve body having spaced inlet and outlet ports separated by an intermediate valve seat in open communication with the inlet and outlet ports;
- a piston reciprocable within a bore in the valve body;
- a valve member being adapted to sealingly mate with the valve seat;
- a biasing member for normally biasing the valve member toward the valve seat;
- a linear motor assembly attached to the valve body, the linear motor comprising a plurality of stator discs, a plurality of copper wire wound stator coils, and a cylindrical tube having a plurality of teeth forming defining a cylindrical opening, a slider positioned within the cylindrical opening, the slider having a plurality of teeth defining a generally cylindrical periphery of the slider assembly, the outer periphery of the slider being smaller than the cylindrical opening, the slider being movable in a stepped manner in response to magnetic flux generated by electrical current passing through successive stator cores, wherein an interior hollow portion of the slider is hermetically sealed from the generally cylindrical outer periphery of the slider, and a linear position sensor coupled to the slider.

10. The valve of claim 9, wherein the stator coils are wound on spool-type bobbins.

11. A valve comprising:
- a valve body having spaced inlet and outlet ports separated by an intermediate valve seat in open communication with the inlet and outlet ports;
- a piston reciprocable within a bore in the valve body;
- a valve member being adapted to sealingly mate with the valve seat;
- a biasing member for normally biasing the valve member toward the valve seat;
- a linear motor assembly attached to the valve body, the linear motor comprising a plurality of steel stator discs, a plurality of copper wire wound stator coils, and a steel cylindrical tube having a plurality of teeth forming defining a cylindrical opening, a steel slider positioned within the cylindrical opening, the slider having a plurality of teeth defining a generally cylindrical periphery of the slider assembly, the outer periphery of the slider being smaller than the cylindrical opening, the slider being movable in a stepped manner in response to magnetic flux generated by electrical current passing through successive stator cores, wherein an interior hollow portion of the slider is hermetically sealed from the generally cylindrical outer periphery of the slider.

12. The valve of claim 11, wherein the stator coils are wound on spool-type bobbins.

13. The valve of claim 11, wherein the exterior cylindrical surfaces of the stator discs form a cylindrical exterior and the stator discs are secured to each other by a fastener.

* * * * *